United States Patent [19]

Schwenk et al.

[11] Patent Number: 4,961,712
[45] Date of Patent: Oct. 9, 1990

[54] MECHANICAL AND ELECTRICAL CONNECTION BETWEEN AN EXTRUDED METAL PROFILE AND A CAST METAL MEMBER

[75] Inventors: Hans M. Schwenk, Straubenhardt; Hans-Ulrich Günther, Pfinztal; Michael Joist, Gaggenau, all of Fed. Rep. of Germany

[73] Assignee: Schroff GmbH, Straubenhardt, Fed. Rep. of Germany

[21] Appl. No.: 423,047

[22] Filed: Oct. 18, 1989

[30] Foreign Application Priority Data

Oct. 20, 1988 [DE] Fed. Rep. of Germany ....... 3835695

[51] Int. Cl.⁵ .............................................. H01R 4/24
[52] U.S. Cl. ..................................... 439/436; 439/816
[58] Field of Search ............... 439/387, 388, 860, 868, 439/883, 436–441, 98, 99, 92, 420

[56] References Cited

U.S. PATENT DOCUMENTS

| | | | |
|---|---|---|---|
| 3,157,735 | 11/1964 | Stroup et al. | 439/387 |
| 3,861,595 | 1/1975 | Deal | 439/436 |
| 4,406,505 | 9/1983 | Avromovich | 439/387 |
| 4,571,013 | 2/1986 | Suffi et al. | 439/99 |
| 4,802,863 | 2/1989 | Debus | 439/387 |

FOREIGN PATENT DOCUMENTS

| | | |
|---|---|---|
| 1895181 | 6/1964 | Fed. Rep. of Germany. |
| 7510294 | 7/1975 | Fed. Rep. of Germany. |
| 2501003 | 7/1976 | Fed. Rep. of Germany. |
| 3048054 | 5/1982 | Fed. Rep. of Germany. |

Primary Examiner—David L. Pirlot
Attorney, Agent, or Firm—Spencer & Frank

[57] ABSTRACT

The present invention relates to a mechanical and electrical connection between an extruded metal profile and a cast metal member. The cast member is provided with a peglike projection which is adapted to the interior configuration of the extruded profile and is insertable into the extruded profile. In order to realize a connection which is reliable even under mechanical stresses, which does not interfere with the subsequent lacquering and burn-in processes and which, moreover, is invisible, the invention provides that a spring of a hardness greater than both the extruded profile and the cast member is disposed between mutually facing faces of the extruded profile and the cast member. Barbs are shaped onto the cast member so as to engage in both components.

17 Claims, 2 Drawing Sheets

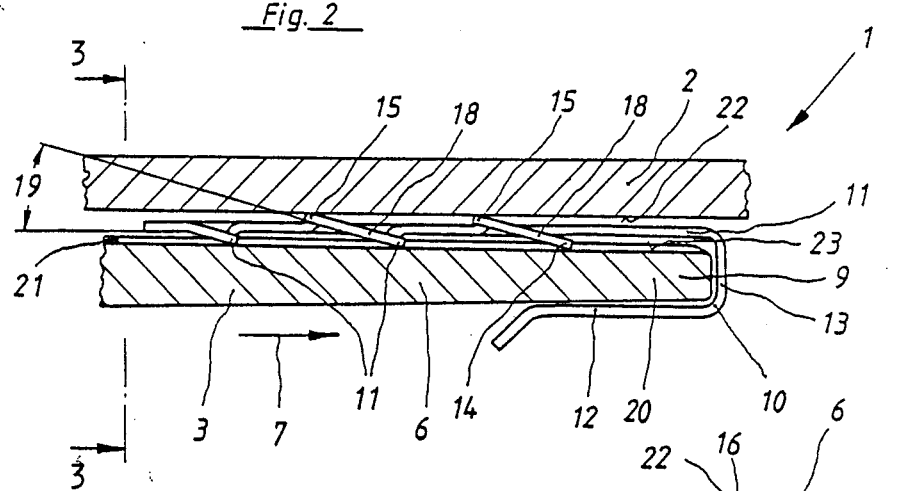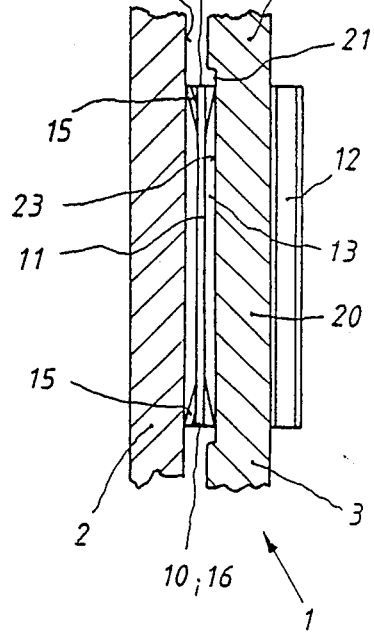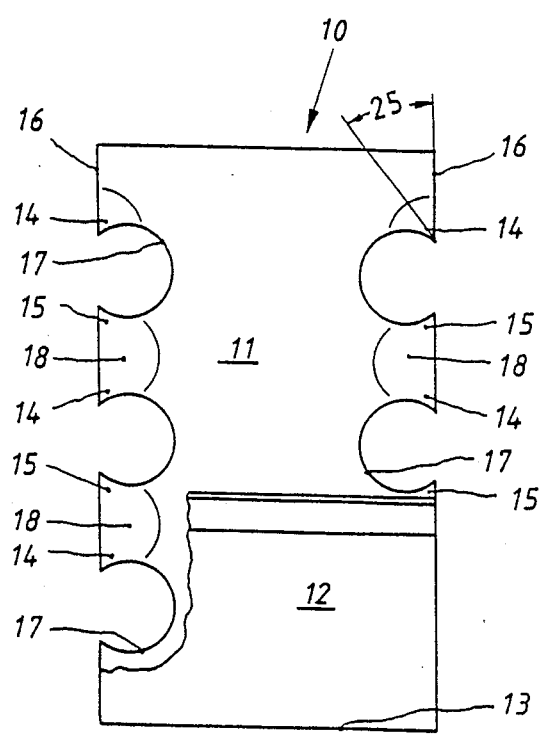

MECHANICAL AND ELECTRICAL CONNECTION BETWEEN AN EXTRUDED METAL PROFILE AND A CAST METAL MEMBER

CROSS REFERENCE TO RELATED APPLICATION

This application claims the priority of Application Ser. No. P 38 35 695.3, filed Oct. 20, 1988, in the Federal Republic of Germany, the subject matter of which is incorporated herein by reference.

BACKGROUND OF THE INVENTION

The present invention relates to a mechanical and electrical connection between an extruded metal profile and a cast metal member, with the cast member being provided with a peg-like projection which is adapted to the interior configuration of the extruded profile and can be inserted thereinto.

Such connections are customary, for example, in rectangular frontal frames for housings to accommodate plug-in modules or module carriers of electronic devices. It is necessary to electrically connect the frontal frame with the housing. This poses no difficulty in frontal frames that are cast in one piece. If, however, the frame is constructed of extruded profiles which are connected at both their ends by way of cast members having peg-like projections which are inserted into the extruded profile, the reliable mechanical and electrical connection of the individual components poses problems. Additional difficulties result from the fact that the connection must permit the subsequent application of lacquer and burn-in of the frame without adversely affecting its function. Moreover, for aesthetic reasons, the connecting members should be invisible.

It is known to connect the individual frame portions by means of inserted corner pieces which are then wedged together. However, this type of connection is possible only with the use of additional components and some deformation. If the wedging pressure is too weak and the component is subject to mechanical stresses, the frame portions will be seated only loosely. Then a secure electrical connection is no longer ensured.

Pressing the profile onto peg-like projection has the drawback that a satisfactory result can be realized only with the use of a hollow profile. Moreover, the exact adherence to close manufacturing tolerances is absolutely necessary.

It is also known to connect metal components together by gluing. Gluing requires great care and adherence to dimensions. The adhesive must be conductive and is therefore expensive. Since the burn-in temperature is limited by the adhesive, the selection of available lacquers is restricted.

It is possible to directly secure together by deformation an extruded profile with the projection of a cast member. However, under high mechanical stresses, the electrical contact may be destroyed.

Finally, it is possible to realize the required connection by screwing or welding the parts together. However, these types of connection also have their drawbacks. Screwing together involves complicated assembly and is disadvantageous for aesthetic reasons since the screw heads are difficult to accommodate invisibly. Welds are possibly only if the two materials are identical which is generally not the case if extruded profiles are to be connected with cast members.

SUMMARY OF THE INVENTION

Based on the above-described prior art, it is the object of the invention to provide a mechanical and electrical connection between an extruded metal profile and a cast metal member which is inserted into the extruded profile by means of a projection adapted to the interior configuration of the extruded profile. Such a connection should be reliable even under mechanical stresses, cost-effective in production, without adversely affecting the visual impression and without limiting the freedom of selection for the subsequent lacquering and burn-in processes.

This is accomplished by the present invention in that, between mutually facing surfaces of the extruded profile and the projection, there is disposed at least one spring equipped with shaped-on barbs which claw into the extruded profile and into the projection, with the spring having a greater hardness than both the extruded profile and the cast member.

According to the present invention, a spring equipped with barbs is thus disposed between the extruded profile and the projection. Since the spring has a greater hardness than the components to be connected together, the shaped-on barbs hook into the extruded profile as well as into the projection of the cast member. This inventive measure creates a reliable mechanical and electrical connection which, due to the resiliency of the spring, remains in effect even under mechanical stresses. The spring can be arranged completely out of view and in no way interferes with the visual impression. The free selectability with respect to subsequent lacquering and burn-in procedures is not restricted by the type of connection provided by the present invention. It is advantageous, for reasons of weight, to employ an extruded profile made of an aluminum alloy.

Advisably the extruded profile is configured as an open profile and is provided with undercuts for the form-locking retention of the projection transversely to its insertion direction. These features as well result in a reduction of weight and additionally reduce the space requirement.

According to further features of the invention, the cast member is a zinc pressure-cast member, with the casting slopes of the projection advantageously extending in such a way that the projection is centered in the extruded profile in the region of the end of the extruded profile while the play of the projection within the extruded profile increases toward the end of the projection. Thus, exact centering of the components to be connected with one another is ensured, although the play of the projection increases in the extruded profile for casting technology reasons. The play is compensated by the resilience of the spring without adversely affecting its function.

In order to facilitate the accurate placement of the spring, it may be of advantage for the projection to be provided with a recess to accommodate the spring. This measure additionally ensures that sufficient installation depth is provided for the spring without it interfering with centering of the projection in the extruded profile.

On the basis of its material and/or its surface coating, the spring may be made insensitive to corrosion so as to make the electrical connection even more reliable. The production of the spring of a steel band may be effected relatively easily and economically.

The barbs may be formed by several recesses with open edges at at least one of the longitudinal sides of the spring when seen in the direction of insertion of the projection, with the lands between the spaced recesses being rotated in the same direction about axes extending transversely to the direction of insertion of the projection. The recesses may be configured in such a way that the tips of the barbs enclose an angle of no more than 90°. In this way it is ensured that the barbs provide optimum clawing engagement. A particularly simple solution from a manufacturing point of view results if the recesses have at least the size of a semicircular area. The angle of rotation should be no more than 45°, preferably between 10° and 30°. By means of the inventive features described above, the spring can be provided with a properly operating barb in an inexpensive manufacturing process.

With respect to assembly, it is of particular advantage for the spring to be provided with a securing arm equipped with the barbs, a holding arm extending at a distance from the securing ar and approximately parallel thereto and with a connecting web which connects the securing arm with the holding arm. In this way, it is possible to push the spring unit composed of the securing arm, the holding arm and the connecting web onto the projection of the cast member in a locking manner and thereafter to introduce the projection together with the spring into the extruded profile, thus completing the mechanical and electrical connection of both parts.

The space between the faces of the extruded profile corresponding to the spring and the projection of the extruded profile should be selected to be larger than the spring when it is compressed into a block but smaller than the thickness of the spring when it is not under load. In this way it is ensured that the resilience of the spring is sufficient to ensure secure engagement of the barbs in both parts to be connected.

According to a further advantageous feature of the invention, the cast member is provided at both its ends with projections which project from the basic body at a right angle in the same direction and each can be connected with an extruded profile by means of a spring equipped with barbs. The above-described inventive measure makes it possible to construct a closed rectangular frame from two cast members and two extruded profiles as well as the springs, with the length dimension of the frames being variable by the use of extruded profiles of the appropriate length.

BRIEF DESCRIPTION OF THE DRAWINGS

One embodiment of the connection according to the invention will now be described with reference to the drawing figures.

FIG. 2 is a partial sectional view along line A—A of FIG. 1 of a connection according to the invention.

FIG. 3 is a sectional view along line B—B of FIG. 2 of the connection according to FIGS. 1 and 2.

FIG. 4 is a partially broken open front view of a spring configured according to the invention.

DETAILED DESCRIPTION OF THE PREFERRED EMBODIMENT

Figure 1:
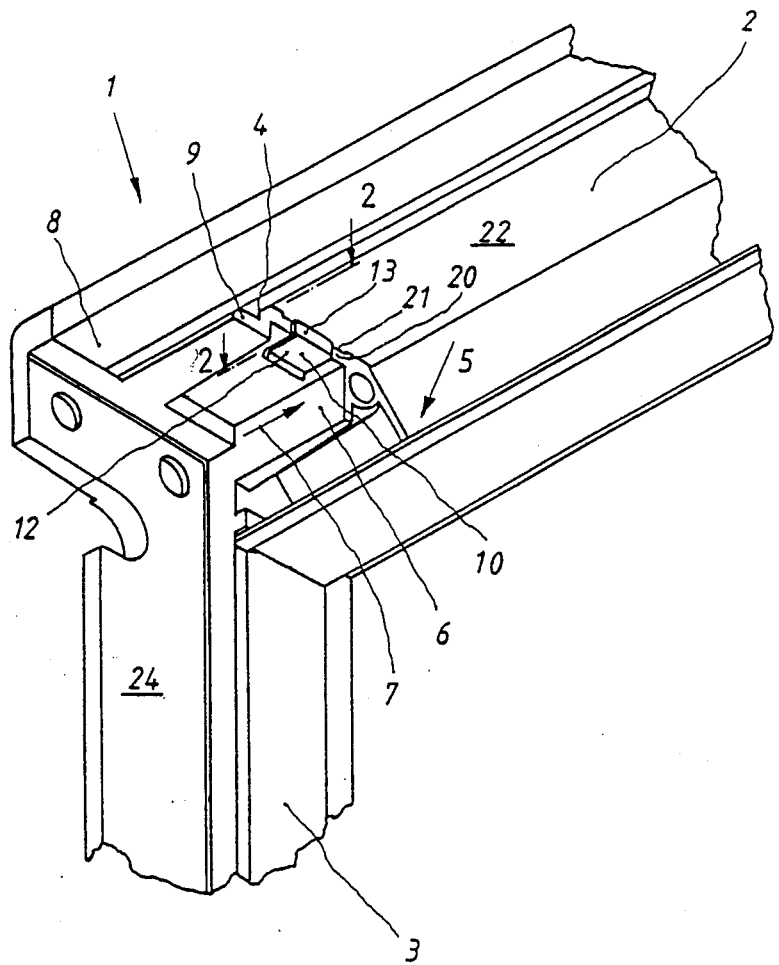
FIG. 1 is an isometric view of the connection according to the invention between an extruded profile and a cast member.

FIGS. 1 to 3 depict a mechanical and electrical connection 1 between an extruded profile 2, here an extruded aluminum profile, and a cast member 3, here a zinc pressurecast member. Extruded profile 2 is configured as an open profile and is provided with undercuts as indicated at 4 and 5 in FIG. 1. These undercuts 4 and 5 serve to formlockingly fix a peg-like projection 6 shaped in one piece to cast member 3 and adapted to the interior configuration of extruded profile 2 transversely to its insertion direction 7. The casting slopes of projection 6 permit proper centering of the end region 8 of extruded profile 2 while the play of projection 6 increases toward projection end 9 in extruded profile 2.

The mechanical and electrical connection 1 between extruded profile 2 and cast member 3 is effected by means of a spring 10. Spring 10 is manufactured of a highly alloyed steel band, e.g. a chromium nickel steel, and includes a securing arm 11, a holding arm 12 which extends at a distance from securing arm 11 and approximately parallel to it as well as a connecting web 13 which connects securing arm 11 with holding arm 12.

Securing arm 11 is equipped with barbs 14 and 15. Barbs 14 and 15 are disposed at both longitudinal sides 16 of securing arm 11. They are formed by open-edged recesses 17 of a size larger than a semicircular area in that the lands 18 remaining between recesses 17 are rotated in the same direction about axes lying transversely to insertion direction 7. In the illustrated embodiment, the rotation angle before assembly is about 20°.

In order to establish the mechanical and electrical connection according to the invention, spring 10 is initially pushed over a web 20 on projection 6 with its securing arm oriented outwardly. Exact placement is facilitated by a recess 21 on the exterior of web 20. When pushed onto web 20, barbs 14 claw into projection 6 so that spring 10 is securely held at cast member 3. Securing member 10 is generally pushed manually onto web 20, i.e. without a tool. Then, extruded profile 2 is pressed beyond projection 6 equipped with securing member 10 on cast member 3, if necessary by means of a rubber hammer or a small press. This causes barbs 15 of spring 10 to claw into extruded profile 2 in such a way that a reliable mechanical and electrical connection between extruded profile 2 and cast member 3 is produced which can be released only by destroying it.

It will be understood that the above description of the present invention is susceptible to various modifications, changes and adaptations, and the same are intended to be comprehended within the meaning and range of equivalents of the appended claims.

What is claimed is:

1. A mechanical and electrical connection between an extruded metal profile and a cast metal member, with the cast member being provided with a peg-like projection adapted to the interior configuration of the extruded profile and insertable into the extruded profile, comprising at least one spring having a greater hardness than the extruded profile said cast member being disposed between mutually facing faces of the extruded profile and the projection, said spring including shaped-on barbs which claw into the extruded profile and the projection.

2. A mechanical and electrical connection as defined in claim 1, wherein the extruded profile is composed of an aluminum alloy.

3. A mechanical and electrical connection as defined in claim 1, wherein the extruded profile is configured as an open profile and is provided with undercuts for a form locking retention of the projection transversely to its insertion direction.

4. A mechanical and electrical connection as defined in claim 1, wherein the cast member is a zinc pressure-cast component.

5. A mechanical and electrical connection as defined in claim 1, wherein the casting slopes of the projection extend in such that in an region of the extruded profile, the projection is centered in the extruded profile and a play of the projection within the extruded profile increases toward the end of the projection.

6. A mechanical and electrical connection as defined in claim 1, wherein the projection is provided with a recess for accommodating the spring.

7. A mechanical and electrical connection as defined in claim 1, wherein the distance between the faces of the extruded profile and of the projection corresponding responding with the spring is larger than said spring when compressed into a block and smaller than the thickness of said spring when not under load.

8. A mechanical and electrical connection as defined in claim 1, wherein due to its material and/or its surface coating, the spring is insensitive to corrosion.

9. A mechanical and electrical connection as defined in claim 8, wherein the spring is manufactured of a steel band.

10. A mechanical and electrical connection as defined in claim 1, wherein the barbs are formed by a plurality of open-edged recesses at least on one longitudinal side of the spring when seen in the insertion direction of the projection, with the lands remaining between the spaced recesses being rotated in the same direction about axes extending transversely to the insertion direction of the projection.

11. A mechanical and electrical connection as defined in claim 10, wherein the recesses are shaped in such that the tips of the barbs enclose an angle of no more than 90°.

12. A mechanical and electrical connection as defined in claim 10, wherein the recesses are each bounded by a circular arc of at least 180°.

13. A mechanical and electrical connection as defined in claim 10, wherein the lands are rotated relative to the spring by an angle of no more than 45°.

14. A mechanical and electrical connection as defined in claim 1, wherein the spring includes a securing arm equipped with the barbs, a holding arm spaced from the securing arm and extending approximately parallel thereto and a connecting web connecting the securing arm with the holding arm.

15. A mechanical and electrical connection as defined in claim 14, wherein the spring is pushed onto the projection of the cast member in a locking manner and thereafter the projection together with the spring is inserted into the extruded profile.

16. A mechanical and electrical connection as defined in claim 1, wherein the cast member is provided with projections at both ends, the projections extending in the same direction at a right angle from a basic body.

17. A mechanical and electrical connection as defined in claim 12, wherein said angle is between 10° and 30°.

* * * * *